June 10, 1952  R. L. COPE  2,599,612
TRANSPORT
Filed July 31, 1947  2 SHEETS—SHEET 1
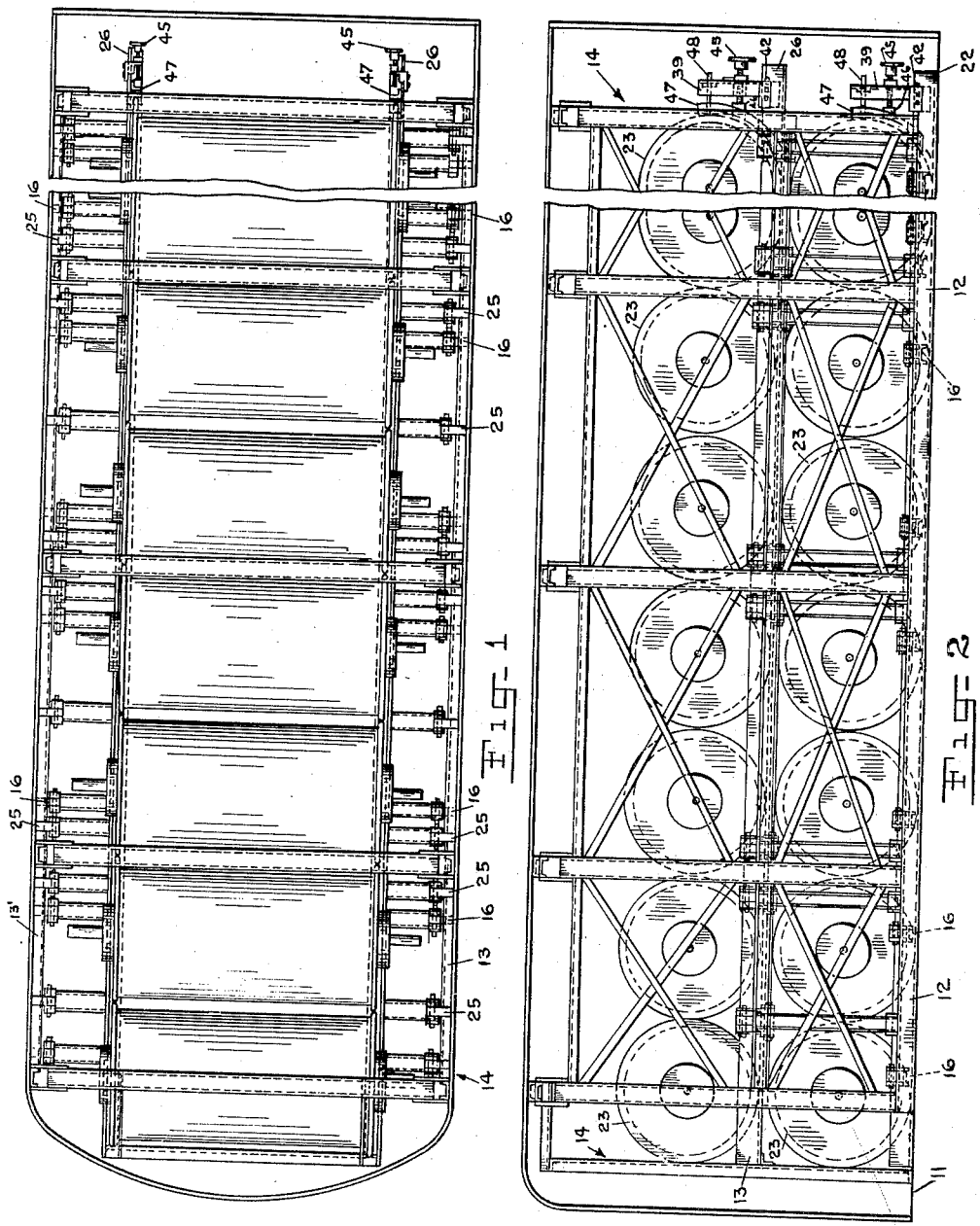
INVENTOR.
REX L. COPE.
BY
ATTORNEYS June 10, 1952         R. L. COPE         2,599,612
TRANSPORT
Filed July 31, 1947         2 SHEETS—SHEET 2
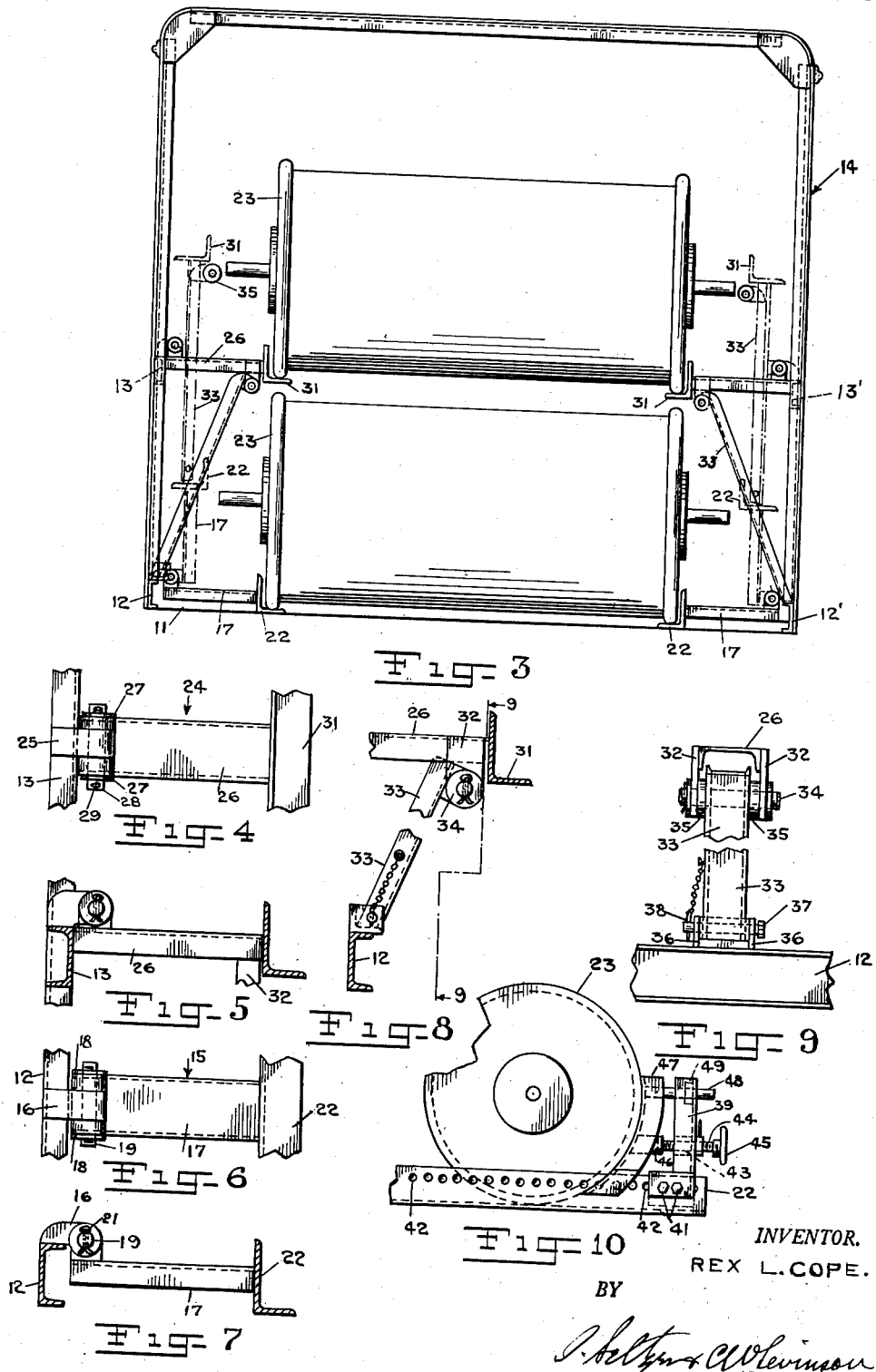
INVENTOR.
REX L. COPE.
BY
ATTORNEYS.

Patented June 10, 1952

2,599,612

UNITED STATES PATENT OFFICE 2,599,612

TRANSPORT

Rex L. Cope, Cumberland, Md., assignor to Celanese Corporation of America, a corporation of Delaware Application July 31, 1947, Serial No. 765,129

2 Claims. (Cl. 105—367)

This invention relates to a device for transporting large cylindrical packages and relates more particularly to a novel arrangement of racks for holding section beams of yarn for transport.

Large section beams of yarn, weighing up to 1200 pounds, are usually transported in trailers holding a relatively large number of such section beams. One of the difficulties attending the use of such trailers is the relative ease with which yarn was bruised and otherwise damaged by the shifting of the section beams during transport and by undue handling of said section beams. It is accordingly, an important object of this invention to provide a novel transport for section beams which will be free from the foregoing and other disadvantages and which will be especially simple in construction and efficient in use.

Another object of this invention is the provision of a novel transport for section beams having racks for supporting said section beams, which racks are removable, and collapsible against the sides of the transport when not in use.

Other objects of this invention, together with certain details of construction and combinations of parts, will appear from the following detailed description.

In the drawings wherein a preferred embodiment of my invention is shown, Fig. 1 is a top plan view of a trailer body having the racks of my invention installed therein.

Fig. 2 is a side elevational view thereof,

Fig. 3 is an end elevational view thereof,

Fig. 4 is a fragmentary top plan view of a rack for supporting the upper row of section beams, Fig. 5 is a side elevational view of an upper rack, partly in section, Fig. 6 is a fragmentary top plan view of a rack for holding the lower row of section beams, Fig. 7 is a side elevational view of a lower rack, partly in section, Fig. 8 is a fragmentary detailed view showing a means for bracing an upper rack when in use, Fig. 9 is a view taken on line 9—9 in Fig. 8, and Fig. 10 is a detail view showing means for chocking the section beams on the racks.

Like reference numerals indicate like parts throughout the several views of the drawings.

Referring to the drawing for a detailed description of my novel transport device, the reference numeral 11 indicates the body of a trailer truck although it is to be understood that any truck body may be employed for use with the racks of my invention. Fixed to the floor of the body along the sides thereof are U-beam rails 12, 12', running substantially the full length of the body, one on each side thereof. Similar rails 13 and 13' are fixed above said rails 12, 12', respectively and coextensive therewith. Upper rails 13, 13' are supported on a suitable framework, generally indicated by reference numeral 14, which is of reinforced construction sufficiently strong for the intended purpose of supporting the weight of the upper row of section beams.

A plurality of collapsible racks are provided along both sides of the truck body. Each lower rack generally indicated by reference numeral 15 comprises a bearing member 16 fixed to rail 12 which has pivotally mounted therein a U-beam bracket 17 having spaced apertured bosses 18 thereon. A bolt 19 extends through the bosses 18 and bearing member 16, which bolt is maintained in position by a cotter pin 21. A length of angle-iron track 22 sufficient to support two section beams 23 is attached to the free ends of two brackets 17. It is to be understood that each rack 15 cooperates with its opposite rack on rail 12' for the purpose of providing a section beam support. In operative position, the angle-iron tracks 22 rest on the floor of the truck body as is shown in Fig. 3. When not required to support section beams, the racks are raised to a position parallel to the sides of the truck body as shown in dot-dash lines in Fig. 3.

Each of the upper racks, generally indicated by reference numeral 24, comprises a bearing member 25 fixed to rail 13. The bearing member has pivotally mounted therein a U-beam bracket 26 having spaced apertured bosses 27 thereon. A bolt 28 extends through the bosses and bearing member and is maintained in position by means of a cotter pin 29. A length of angle-iron track 31 sufficient to support two section beams is attached to the free ends of each two brackets. As described in connection with the lower racks, two opposing racks cooperate to support the section beams.

In order that the weight of the loaded section beams may be adequately supported by the upper racks, said upper racks are provided with a reinforcing arrangement. To this end each bracket 26 has fixed thereto apertured ears 32 at the free end thereof adjacent to track 31. A brace 33, which may be a section of a U-beam, is pivotally mounted in said ears 32 by means of a bolt 34 which passes through said ears and bosses 35 fixed to said brace. In operative position the lower end of the brace 33 is held between apertured ears 36 fixed to rails 12, and also 12', by means of a bolt 37 which passes through said ears and suitable openings (not shown) in the flanges of the brace 33. The bolt is retained in position by a captive pin 38. When not required to support section beams the upper racks 24, after brace 33 is detached from ears 36, are raised to the position shown in dot-dash lines in Fig. 3, i. e. to a position parallel to the sides of the truck body.

To hold the section beams against movement when on the tracks, there is provided a chocking arrangement which is adapted to be mounted on the tracks. This chocking arrangement comprising a standard 39 which may be adjustably held by bolts 41 passing through holes 42 formed in the tracks. Standard 39 has a threaded bearing member 43 for the reception of a threaded rod 44 having at one end a hand-wheel 45 and at the other a bearing 46 fixed in a chock block 47 having an arcuate contact surface of the same radius as the flange of the section beam which it is adapted to contact. The chock block 47 is also provided with a guide rod 48 which is slidably mounted in a bushing 49 in the standard 39.

An important advantage of the section beam racks described above is that any desired number may be employed, with the remaining racks, if any, folded out of the way permitting the use of the space for other articles of merchandise. Another feature of the racks of the instant invention is that they may be readily attached or detached from the rails on which they are mounted.

It is to be understood that the foregoing detailed description is given merely by way of illustration and that many variations may be made therein without departing from the spirit of my invention.

Having described my invention, what I desire to secure by Letters Patent is:

1. A structure for use in transporting heavy articles comprising a body having a floor and framework forming vertical side walls, an integral rail supported on said floor along the length of each of said side walls, an integral rail fixed to each of said side walls above said first-mentioned rails and in alignment therewith, a plurality of racks pivotally mounted on each of said rails for angular movement in a plane normal to said rails, said racks each having a length of track attached thereto for holding said articles and for preventing lateral movement thereof, the construction and arrangement being such that the racks and tracks carried thereby, when not in use, are movable to a position parallel to the side walls of said body so as to cause the interior central portion of said body to be substantially free of said racks and said tracks.

2. A structure for use in transporting heavy articles comprising a body having a floor and framework forming vertical side walls, an integral rail supported on said floor along the length of each of said side walls, an integral rail fixed to each of said side walls above said first-mentioned rails and in alignment therewith, a plurality of racks pivotally mounted on each of said rails for angular movement in a plane normal to said rails, said racks each having a length of track attached thereto for holding said articles and for preventing lateral movement thereof, means for bracing the racks on the upper rails when in use, said means comprising a brace pivotally mounted on each of said latter racks and supported when in use on the lower rail, and means fixed to said lower rails for locking said brace in position, the construction and arrangement being such that the racks, the tracks carried thereby and the brace, when not in use, are movable to position parallel to the side walls of said body so as to cause the interior central portion of said body to be substantially free of said racks, said tracks and said brace.

REX L. COPE.

REFERENCES CITED

The following references are of record in the file of this patent:

UNITED STATES PATENTS

| Number | Name | Date |
| --- | --- | --- |
| 752,875 | Wirsching | Feb. 23, 1904 |
| 1,828,579 | Snyder | Oct. 20, 1931 |
| 1,841,066 | Simning | Jan. 12, 1932 |
| 1,994,695 | Dolan et al. | Mar. 19, 1935 |
| 2,009,149 | Pierce | July 23, 1935 |
| 2,077,650 | Sweeley et al. | Apr. 20, 1937 |
| 2,149,015 | Giddings | Feb. 28, 1939 |
| 2,334,336 | Lathrop | Nov. 16, 1943 |
| 2,335,517 | Koonce | Nov. 30, 1943 |
| 2,359,106 | Hayes | Sept. 26, 1944 |
| 2,370,551 | Liebgott et al. | Feb. 27, 1945 |